US007740534B2

(12) United States Patent
Walker et al.

(10) Patent No.: US 7,740,534 B2
(45) Date of Patent: Jun. 22, 2010

(54) SYSTEM AND METHOD ENABLING EXTENSION OF A TIME ELEMENT IN A GAME

(75) Inventors: Jay S. Walker, Ridgefield, CT (US); James A. Jorasch, Stamford, CT (US); Geoffrey M. Gelman, Stamford, CT (US); Stephen C. Tulley, Fairfield, CT (US); Daniel E. Tedesco, Huntington, CT (US)

(73) Assignee: IGT, Reno, NV (US)

( * ) Notice: Subject to any disclaimer, the term of this patent is extended or adjusted under 35 U.S.C. 154(b) by 861 days.

(21) Appl. No.: 10/778,984

(22) Filed: Feb. 13, 2004

(65) Prior Publication Data

US 2004/0162130 A1 Aug. 19, 2004

Related U.S. Application Data

(60) Provisional application No. 60/447,350, filed on Feb. 13, 2003.

(51) Int. Cl.
*G06F 17/00* (2006.01)
*G06F 19/00* (2006.01)

(52) U.S. Cl. .............................. 463/16; 463/17; 463/18; 463/19; 463/20; 463/25; 463/29; 273/138.1; 273/139

(58) Field of Classification Search ..................... 463/1, 463/16-20, 25, 29; 273/138.1, 139
See application file for complete search history.

(56) References Cited

U.S. PATENT DOCUMENTS

| | | | |
|---|---|---|---|
| 5,287,269 A | | 2/1994 | Dorrough |
| 6,012,983 A | | 1/2000 | Walker et al. ................ 463/20 |
| 6,077,163 A | | 6/2000 | Walker et al. ................ 463/26 |
| 6,113,495 A | | 9/2000 | Walker et al. ................ 463/42 |
| 6,203,430 B1 | | 3/2001 | Walker et al. ................ 463/20 |
| 6,234,896 B1 | | 5/2001 | Walker et al. ................ 463/16 |
| 6,312,332 B1 | * | 11/2001 | Walker et al. ................ 463/23 |
| 6,319,122 B1 | | 11/2001 | Packes, Jr. et al. ............ 463/16 |
| 6,322,309 B1 | | 11/2001 | Thomas et al. ................ 413/20 |
| 6,336,636 B1 | | 1/2002 | Smart ........................ 273/447 |
| 6,364,765 B1 | | 4/2002 | Walker et al. ................ 463/16 |
| 6,632,141 B2 | | 10/2003 | Webb et al. |
| 6,645,075 B1 | | 11/2003 | Gatto et al. |
| 7,192,342 B2 | * | 3/2007 | Shoemaker, Jr. ............... 463/7 |
| 7,572,183 B2 | | 8/2009 | Olivas et al. |
| 2002/0132660 A1 | * | 9/2002 | Taylor ........................ 463/16 |
| 2002/0147040 A1 | | 10/2002 | Walker et al. ................ 463/25 |
| 2003/0162586 A1 | * | 8/2003 | Ikeya et al. .................. 463/20 |
| 2004/0036224 A1 | * | 2/2004 | Crompton .................. 273/454 |
| 2004/0102238 A1 | * | 5/2004 | Taylor ........................ 463/16 |
| 2008/0108406 A1 | | 5/2008 | Oberberger |
| 2008/0108425 A1 | | 5/2008 | Oberberger |
| 2009/0061991 A1 | | 3/2009 | Popovich et al. |
| 2009/0061997 A1 | | 3/2009 | Popovich et al. |
| 2009/0061998 A1 | | 3/2009 | Popovich et al. |
| 2009/0061999 A1 | | 3/2009 | Popovich et al. |

* cited by examiner

*Primary Examiner*—Peter DungBa Vo
*Assistant Examiner*—Milap Shah
(74) *Attorney, Agent, or Firm*—K&L Gates LLP

(57) ABSTRACT

Disclosed herein is a system and method for facilitating the extension of a time-based element in a game of chance. In some embodiments, the time-based element may be extended as a result of a random event, such as the outcome of a random number generator. In other embodiments, the time-based element may be extended as a result of a player's purchase of the time extension.

36 Claims, 4 Drawing Sheets

SYSTEM AND METHOD ENABLING EXTENSION OF A TIME ELEMENT IN A GAME

The present application claims the benefit of priority of U.S. Provisional Patent Application No. 60/447,350, filed Feb. 13, 2003, which is incorporated herein by reference.

BACKGROUND

Gaming devices (e.g., reeled slot machines or video poker machines) generate more than $15 billion per year in revenue for casinos in the United States alone. This figure accounts for the majority of the gaming revenue for a typical United States casino. The situation is similar in other countries in which gaming devices are popular, such as Europe and Australia. Accordingly, casino operators are interested in increasing the enjoyment of playing a slot machine in order to maintain or increase this level of revenue.

Since casino profits are based on the amount wagered by patrons, casinos are highly motivated to expand and retain share within their given market. Increased playing duration, average wager, and rates of play are factors contributing to the profitability of the slot machines and other gaming devices of a casino.

DETAILED DESCRIPTION

Definitions

Figure 1:
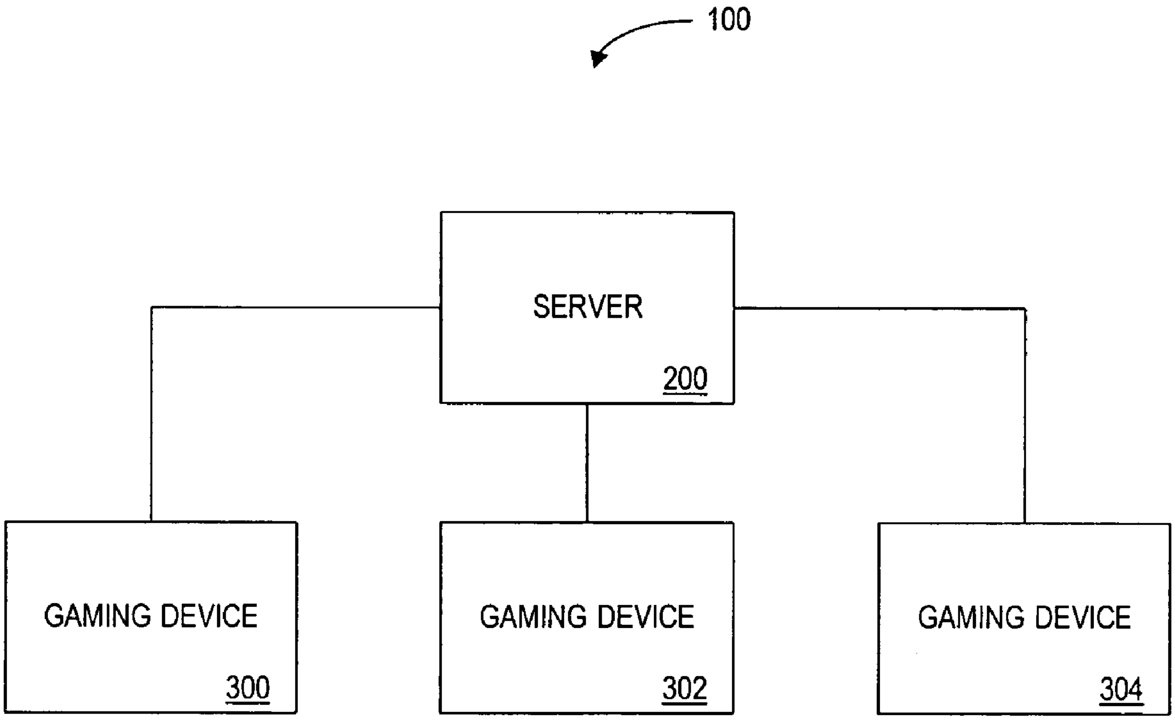
FIG. 1 is a block diagram illustrating a system for implementing an embodiment of the present invention.

The following terms have the following meanings, unless otherwise indicated.

Basic Game: A game associated with a handle pull. (different than a meta-game).

Bonus Payout: A payout awarded in a meta-game. (different than a payout).

Controller: An electronic device (e.g., a computer) that communicates with one or more gaming devices. In a manner well known in the art, the controller may function as a computer server and may control the actions of gaming devices. The controller may also contain or access databases to record statistics such as coin-in, coin-out, jackpot information, theoretical wins, etc.

Game: A wagering activity whereby a player posts consideration, usually monetary in form, in exchange for a chance at winning a payout. The definition is intended to include basic games and meta-games.

Gaming device: Any electrical, mechanical, or electromechanical device that accepts wagers, steps through a process to determine an outcome, and pays winnings based on the outcome. The outcome may be randomly generated, as with a slot machine; may be generated through a combination of randomness and player skill, as with video poker; or may be generated entirely through player skill. Gaming devices may include slot machines (both video and mechanical reels), video poker machines, video blackjack machines, video roulette machines, video keno machines, video bingo machines, pachinko machines, video lottery terminals, handheld gaming devices, and the like.

Gaming session, Session: A gaming event with a beginning and end that may encompass, e.g. a number of spins or span of time. The end of the game may be determined voluntarily (in which the player elects to stop play) or involuntarily (in which the gaming device terminates play). A gaming session is typically correlated with a meta-game, such that a meta-game is resolved upon completion of a gaming session.

Handle Pull, Pull, Spin: A single play at a gaming device whether or not a handle is involved in the play and whether or not a handle is even included in the gaming device. The definition is flexible in that a single play might constitute a single complete game, or a single wager. Handle pulls are generally associated with discrete basic games that may be resolved independently of a meta-game.

Meta-Game: A game associated with a gaming session, as opposed to a specific, isolated handle pull. (different than a basic game).

Outcome: The result of gaming event, for example "cherry-cherry-cherry" in a three reel slot machine game, a "push" in blackjack, a "flush" in video poker, the completion of a puzzle, the attainment of a goal, etc. Different types of gaming devices may have widely varying types of outcomes.

Payout: The prize, reward or winnings associated with a certain outcome in a basic game. (different than a bonus payout).

Peripheral Device: A device operatively connected to or in communication with a gaming device that is configured to assist in the operation of functions related to basic games and/or meta-games. Examples of peripheral devices include (1) electronic apparatuses "retrofitted" to conventional gaming devices so that inventive processes disclosed herein may be realized through game play at such gaming devices, (2) Personal Digital Assistants (PDAs) such as those manufactured by Palm, Inc., (3) lap top computers, (4) cellular telephones, (5) pagers, or (6) any combination thereof. See detailed discussion herein.

Player Tracking Card: Most casinos issue plastic or paper cards (resembling frequent shopper cards) to players as a way of identifying the player at a slot machine or table game. As is well known in the art, such cards typically have encoded thereon (in machine-readable and/or human readable form) a player identifier (e.g., a six digit number) which uniquely identifies the player (e.g., because the number is associated with a record in a database that includes corresponding player information). At a slot machine, the player inserts the card into a reader device and the player identifier is read from the card, most often magnetically. From the player identifier which the reader device reads, the corresponding player information may in turn be read from the database, typically via a network connection between the reader device and a device hosting the database.

Prepaid Session: An amount of time for game play or a number of handle pulls that are paid for in advance. Once a session is prepaid, the player does not need to supply any additional funds until the session has been completed. A prepaid session may allow the player to complete many games during the session.

Primary Game Screen: A screen used to display game information such as a video representation of one or more spinning reels. Generally, the primary game screen is used to show information associated with the basic game.

Secondary Game Screen: A screen used to display secondary game information such as the animation and graphics associated with a bonus round or meta-game. Generally, the secondary game screen is used to show information associated with the meta-game.

Time-Based Element, Time-Based Game Element, Time Element: A temporal or arithmetical aspect of a game (basic game or meta-game) that is measured by a processor and tracked in a memory operatively connected thereto for the purpose of qualifying a player for a payout or bonus payout.

Introduction

Disclosed herein is a system and method for facilitating the extension of a time-based element in a game of chance. In some embodiments, the time-based element may be extended as a result of a random event, such as the outcome of a random number generator. In other embodiments, the time-based element may be extended as a result of a player's purchase of the time extension.

The time-based element that may be extended may include, but is not limited to:

(1) a time associated with a player that is tracked for purposes of qualifying the player for a payout resulting from a basic game, such as:
   a. an expiration period associated with a component of an outcome in a basic game, such as a card in a poker-themed game;
(2) a time associated with a player or gaming session that is tracked for purposes of qualifying the player for a bonus payout resulting from a meta-game, such as:
   a. an expiration period associated with a symbol that is tracked for purposes of qualifying a player for a bonus payout;
   b. a time period within which a player must accumulate a total number of outcomes in order to qualify for a bonus payout;
   c. a time period reflecting the registration of a player in a multi-player, endurance-oriented meta-game that is tracked for purposes of qualifying a player for a bonus payout;
(3) a prepaid session period, such as:
   a. a prepaid purchase of a unit of time within which many handle pulls are possible;
   b. a prepaid number of handle pulls;
(4) an entertainment-based payout that is output over a period of time, such as audio or video content, and is provided to a player as a reward for interacting with a gaming device
(5) a time period that is tracked for purposes of qualifying a player for "comp" benefits; or
(6) any combination thereof.

The time-extension functionality enabled by certain embodiments of the present invention serves to prolong patronage of gaming devices, and enhance player entertainment.

Apparatus Architecture

Figure 2:
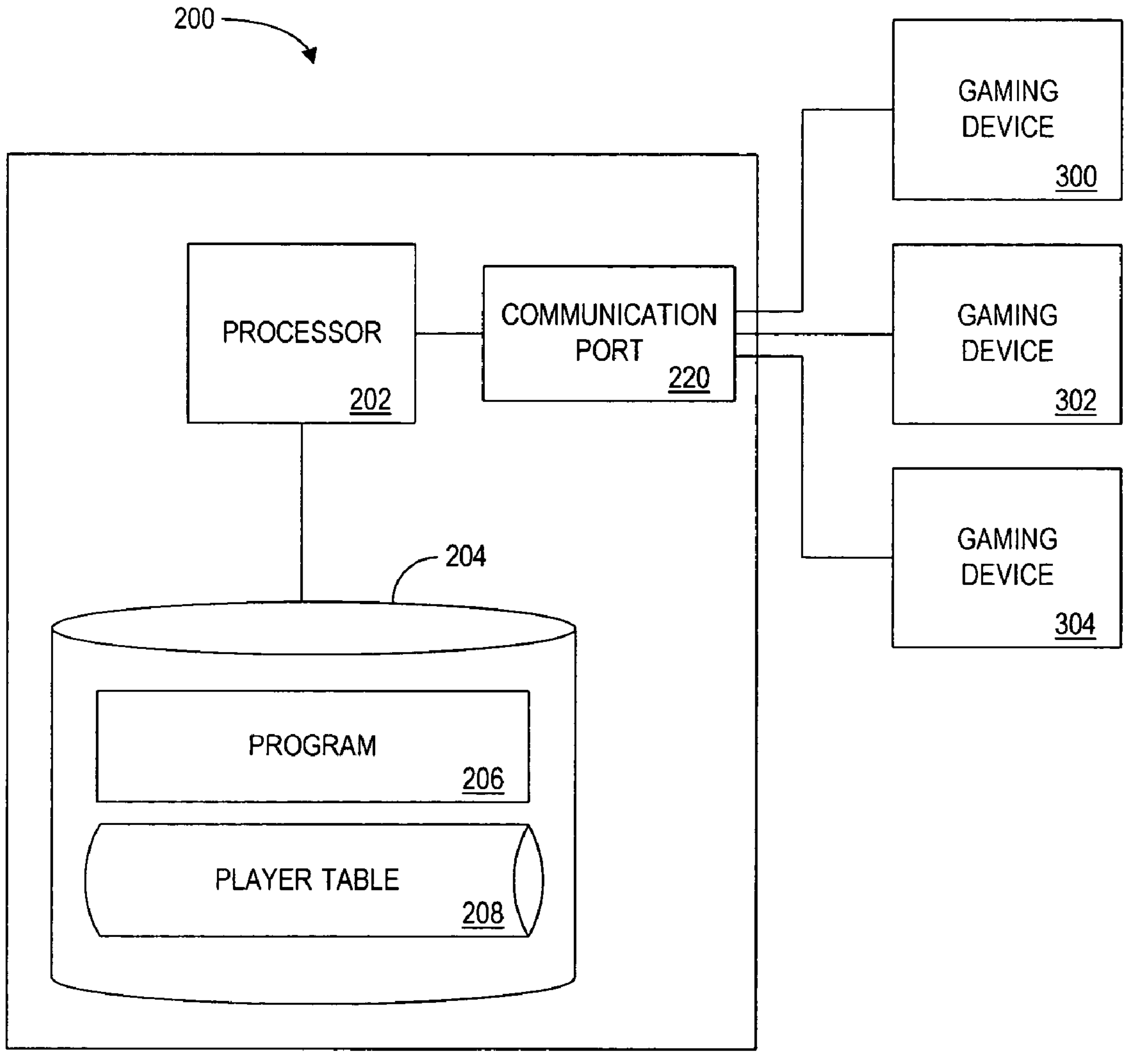
FIG. 2 is a block diagram of a slot server according to an embodiment of the present invention.
Figure 3:
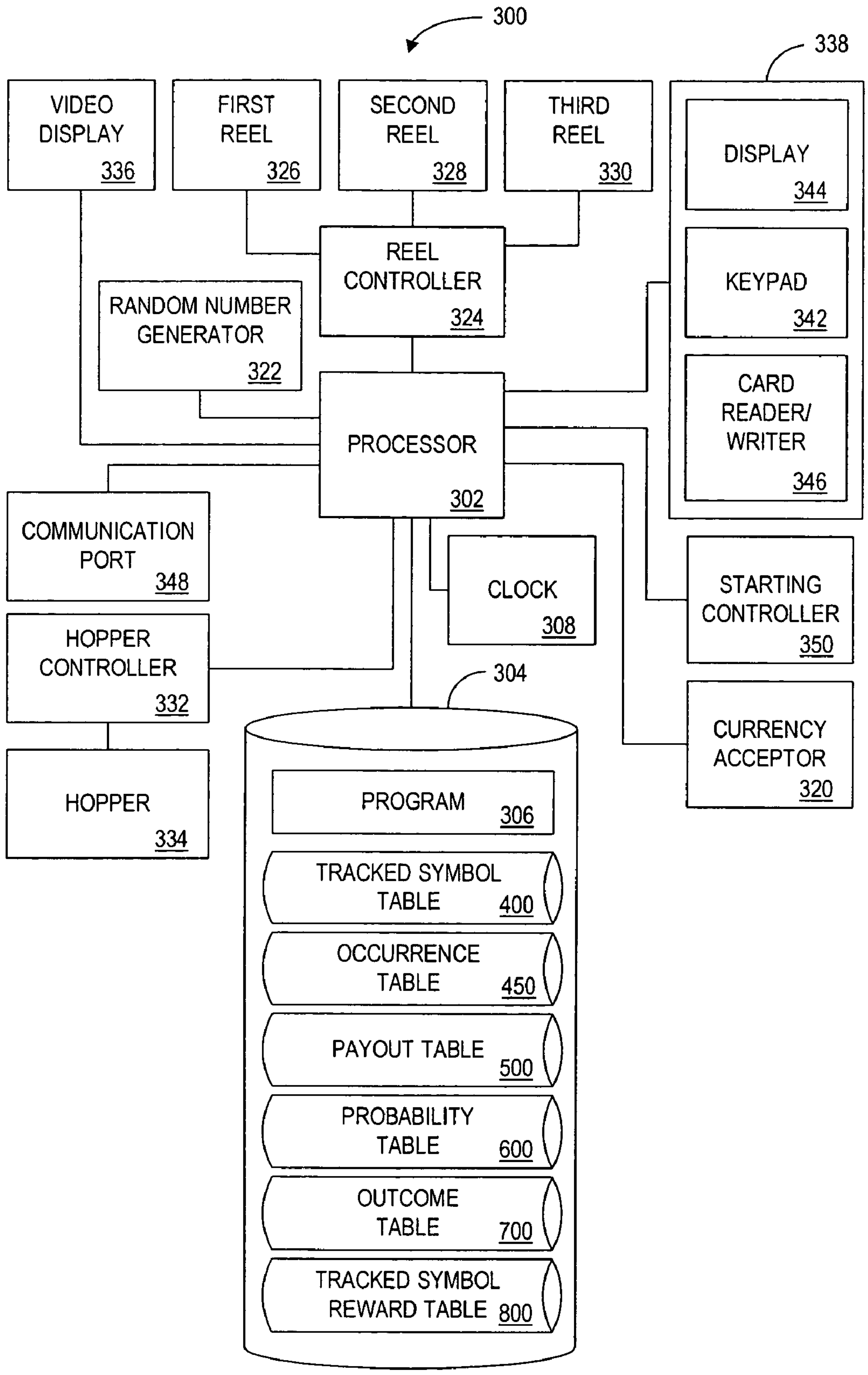
FIG. 3 is a block diagram of an electronic gaming device according to an embodiment of the present invention.

FIGS. 1-3 generally illustrate the architecture of an apparatus according to an exemplary embodiment of the invention. FIG. 1 depicts a block diagram of a slot network 100. The network 100 includes a slot machine server 200 ("server") that is linked to and communicates with networked gaming devices or slot machines 300, 302 and 304. Although three gaming devices are shown, any number of networked gaming devices could be linked to and/or in communication with the server 200.

Embodiments of the present invention can be configured to work in a network environment including a computer (e.g., a slot server of a casino) that is in communication, via a communications network, with one or more gaming devices (e.g., slot machines, video poker machines). The computer may communicate with the gaming devices directly or indirectly, via a wired or wireless medium such as the Internet, LAN, WAN or Ethernet, Token Ring, or via any appropriate communications means or combination of communications means. Each of the gaming devices may comprise computers, such as those based on the Intel® Pentium® processor, that are adapted to communicate with the computer. Any number and type of devices may be in communication with the computer.

Communication between the devices and the computer, and among the devices, may be direct or indirect, such as over the Internet through a Web site maintained by computer on a remote server or over an on-line data network including commercial on-line service providers, bulletin board systems and the like. In yet other embodiments, the devices may communicate with one another and/or the computer over RF, cable TV, satellite links and the like.

Some, but not all, possible communication networks that may comprise the network or be otherwise part of the system include: a local area network (LAN), a wide area network (WAN), the Internet, a telephone line, a cable line, a radio channel, an optical communications line, and a satellite communications link. Possible communications protocols that may be part of the system include: Ethernet (or IEEE 802.3), SAP, ATP, Bluetooth™, and TCP/IP. Communication may be encrypted to ensure privacy and prevent fraud in any of a variety of ways well known in the art.

Those skilled in the art will understand that devices in communication with each other need not be continually transmitting to each other. On the contrary, such devices need only transmit to each other as necessary, and may actually refrain from exchanging data most of the time. For example, a device in communication with another device via the Internet may not transmit data to the other device for weeks at a time.

In an embodiment, a server computer may not be necessary and/or preferred. For example, the present invention may, in one or more embodiments, be practiced on a stand-alone gaming device and/or a gaming device in communication only with one or more other gaming devices. In such an embodiment, any functions described as performed by the computer or data described as stored on the computer may instead be performed by or stored on one or more gaming devices.

FIG. 2 illustrates the architecture of the server 200. Server 200 includes a processor 202, a storage device 204 and a communication port 220, as well as conventional server components well known in the art. A communication port 220 enables the server 200 to communicate with gaming devices 300, 302 and 304. Storage device 204 comprises an appropriate combination of magnetic and optical memory, such as disk drive memory, and semiconductor memory such as random access memory and read only memory. Storage device 204 contains program 206 and player table 208 for controlling server 200 in accordance with various embodiments of the present invention.

Various computer readable media may also store programs such as program 206. For example, a program may be stored in media such as compact discs, DVDs, and in electromagnetic transmissions (e.g. computer network transmissions).

An alternative system according to an embodiment of the present invention includes a computer (e.g., a slot server of a casino) that is in communication, via a communications network, with one or more gaming devices (e.g., slot machines, video poker machines). This system can include at least one gaming device which is also in communication with one or more peripheral devices. A peripheral device may, in turn, be in communication with a peripheral device server and, in some embodiments, with the computer. In one or more embodiments the peripheral device server may be in communication with one or more gaming devices and/or computer.

The computer may communicate with the devices and peripherals directly or indirectly, via a wired or wireless medium such as the Internet, LAN, WAN or Ethernet, Token Ring, or via any appropriate communications means or combination of communications means. For example, the computer may communicate directly with one of the gaming devices (e.g., via a LAN) and indirectly (e.g., via a gaming device) with a peripheral device. In another example, the computer may communicate with one of the gaming devices via a LAN and with another of the gaming devices via the Internet (e.g., if the particular gaming device comprises a personal computer in communication with an online casino).

Each of the devices may comprise computers, such as those based on the Intel® Pentium® processor, that are adapted to communicate with the computer. Further, each of the devices may comprise a gaming device such as a mechanical or electronic slot machine, a video poker machine, a video blackjack machine, a video keno machine, a pachinko machine, a video roulette machine, and/or a lottery terminal. Further yet, each of the devices may comprise an external or internal module associated with one or more of the gaming devices that is capable of communicating with one or more of the gaming devices and of directing the one or more gaming devices to perform one or more functions. Any number of devices may be in communication with the computer. Any number and type of peripheral devices may be in communication with a gaming device, peripheral device server and the computer.

Communication between the devices and the computer, between the devices, between the peripheral device server and the devices, and between the peripheral device server and the computer, may be direct or indirect, such as over the Internet through a Web site maintained by the computer on a remote server or over an on-line data network including commercial on-line service providers, bulletin board systems and the like. In yet other embodiments, any and all of the devices of the system (i.e., the devices, the computer, and the peripheral device server) may communicate with one another over RF, cable TV, satellite links and the like.

Some, but not all, possible communication networks that may comprise the network or otherwise be part of the system include: a local area network (LAN), a wide area network (WAN), the Internet, a telephone line, a cable line, a radio channel, an optical communications line, and/or a satellite communications link. Possible communications protocols that may be part of the system include: Ethernet (or IEEE 802.3), SAP, ATP, Bluetooth™, and TCP/IP. Communication may be encrypted to ensure privacy and prevent fraud in any of a variety of ways well known in the art.

In an embodiment, the computer may not be necessary and/or preferred. For example, the present invention may, in one or more embodiments, be practiced on a stand-alone gaming device, one or more gaming devices in communication with one or more peripheral devices, one or more gaming devices in communication with a peripheral device server, one or more peripheral devices in communication with a peripheral device server, and/or a gaming device in communication only with one or more other gaming devices. In such an embodiment, any functions described as performed by the computer or data described as stored in a memory of the computer may instead be performed by or stored on one or more gaming devices, one or more peripheral devices, and/or peripheral device server.

Similarly, a peripheral device server may not be desired and/or needed in some embodiments of the present invention. In embodiments that do not involve a peripheral device server, any or all of the functions described herein as being performed by a peripheral device server may instead be performed by the computer, one or more gaming devices, one or more peripheral devices, or a combination thereof. Similarly, in embodiments that do not involve a peripheral device server, any data described herein as being stored in a memory of a peripheral device server may instead be stored in a memory of another server computer, one or more gaming devices, one or more peripheral devices, or a combination thereof.

Any or all of the gaming devices may, respectively, include or be in communication with a peripheral device. A peripheral device may be a device that receives information from (and/or transmits information to) one or more gaming devices. For example, a peripheral device may be operable to receive information about games being played on a gaming device, such as the initiation of a game and/or a random number that has been generated for a game.

In one or more embodiments, one or more such peripheral devices may be in communication with a peripheral device server. This allows the peripheral device server to receive information regarding a plurality of games being played on a plurality of gaming devices. The peripheral device server, in turn, may be in communication with the computer. It should be understood that any functions described herein as performed by a peripheral device may also or instead be performed by the peripheral device server. Similarly, any data described herein as being stored on or accessed by a peripheral device may also or instead be stored on or accessed by the peripheral device server.

A peripheral device may be operable to access a database (e.g., of a peripheral device server) to provide benefits (e.g., cashless gaming receipts) based on, for example, an actual outcome of a game.

The peripheral device server may also monitor player gambling history over time by associating gambling behavior with player identifiers, such as player tracking card numbers. For example, information about the player obtained or accessed by a peripheral device server may be analyzed, e.g., to identify those players that a particular gaming machine owner, operator, or manufacturer finds most desirable. Based upon desired objectives, the peripheral device server may direct the appropriate peripheral device to issue customized messages, offers, and games to specific players.

Information received by a peripheral device from a gaming device may include gambling data such as number of games initiated per unit of time, outcomes displayed for games initiated, payouts corresponding to outcomes displayed, a credit meter balance of the gaming device, and/or data associated with the player currently playing the gaming device.

The functions described herein as being performed by a peripheral device server and/or a peripheral device may, in one or more embodiments, be performed by the computer (in lieu of or in conjunction with being performed by a peripheral device server and/or a peripheral device).

In one or more embodiments, a peripheral device may be useful for implementing the embodiments of the present invention into the operation of a conventional gaming device. For example, in order to avoid or minimize the necessity of modifying or replacing a program already stored in a memory of a conventional gaming device, an external or internal module that comprises a peripheral device may be inserted in, associated with, or otherwise "retrofitted" to the gaming device.

Thus, for example, a peripheral device may be utilized to monitor play of the gaming device and output messages and an outcome of a game. In such embodiments the gaming device with which the peripheral device is in communication may continue to operate conventionally. In such embodiments the gaming device may continue to output an outcome for each game played. The peripheral device, however, may output a second outcome or payout when appropriate. The peripheral device may also output messages to the player. The peripheral device may also provide benefits to a player (e.g., coins, tokens, electronic credits, paper receipts exchangeable for cash, services, and/or merchandise).

Accordingly, a peripheral device may include (i) a communications port (e.g., for communicating with one or more gaming devices, peripheral device server, another peripheral device, and/or computer; (ii) a display (e.g., for displaying messages and/or outcomes and payouts), (iii) another output means (e.g., a speaker, light, or motion device to communicate with a player), and/or (iv) a benefit providing means (e.g., a printer and paper dispensing means, a credit meter, and/or a hopper and hopper controller).

In one or more embodiments, the peripheral device may not output outcomes and/or messages to a player but may instead direct the processor of a gaming device to perform such functions. For example, a program stored in a memory of peripheral device may cause a processor of a gaming device to perform certain functions. For example, a program stored in a memory of peripheral device may cause a processor of a gaming device to output an outcome, determine an outcome, output a message, access a database, provide a benefit, refrain from providing a benefit (e.g., by not sending a signal to a hopper controller of the gaming device when it otherwise normally would), and/or communicate with another device. Examples of peripheral devices include (1) electronic apparatuses "retrofitted" to conventional gaming devices so that inventive processes disclosed herein may be realized in conjunction with game play at the gaming device, (2) Personal Digital Assistants (PDAs) such as those manufactured by Palm, Inc., (3) lap top computers, (4) cellular telephones, (5) pagers, or (6) any combination thereof.

FIG. 3 illustrates the architecture of a gaming device embodied as a slot machine 300. Slot machine 300, which may be substantially similar to slot machines 302 and 304, is controlled by processor 302 and communicates with slot server 200 via communication port 348. Processor 302 is connected to storage device 304, which stores program instructions and data for operating slot machine 300 in accordance with embodiments of the present invention. Storage device 304 further stores program 306 which preferably includes instructions for directing the processor 302, such as directing the processor to conduct a game of chance and instructions for implementing a method of determining a bonus payout. In addition, a gaming device (e.g. slot machine) may receive one or more programs (e.g. program 306) from a server (e.g. server 200), and run that program.

Further connected to processor 302 are a clock 308, a player card tracking device 338, a random number generator 322, a reel controller 324 for controlling reels 326, 328 and 330, a hopper controller 332 having an associated hopper 334, a currency acceptor 320 and a video display 336. It should be noted that video display 336 may display information which may serve as an adequate substitute for reels 326, 328 and 330.

As illustrated, slot machine 300 comprises many conventional components. Some non-conventional components of slot machine 300 possibly include the program instructions and data stored in storage device 304, as well as the tracked symbol meter 360. For purposes of better illustrating the embodiments, several conventional components, well known to those skilled in the art, are described only briefly. Although the present embodiment of the invention is described as implemented with physical components, the invention applies equally well to and includes software embodiments such as would be implemented on the Internet and other computer data networks.

Processor 302 may be embodied as one or more well known processing units, for example a Pentium class CPU manufactured by Intel Corp., or the like. Data storage device 304 comprises an appropriate combination of magnetic and optical memory, such as disk drive memory, and semiconductor memory such as random access memory and read only memory. In addition to the program instructions and data shown in FIG. 3, storage device 304 stores appropriate operating system and control software (not shown), functional to operate gaming device 300 in the manner described below. Random number generator 322 comprises one of many well known random or pseudo-random number generators suitable for use in a gaming device.

Currency acceptor 320 is operative to receive one or more coins or bills, and to transmit an appropriate value signal to processor 302. Hopper controller 332, and hopper 334 connected thereto, are operative under the control of processor 302 to dispense coins to a player. Starting controller 350 comprises a player-operated device such as a handle or button for initiating the play of a game.

Player card tracking device 338 comprises a player tracking interface including a card reader/writer 346 for receiving a player tracking card (not shown), a display 344 for communicating messages to the player, and a keypad 342 for receiving player input such as a player identifier.

The gaming device may be implemented as a system controller, a dedicated hardware circuit, an appropriately programmed general-purpose computer, or any other equivalent electronic, mechanical or electromechanical device. The gaming device may comprise, for example, a slot machine, a video poker machine, a video blackjack machine, a video keno machine, a video lottery machine, a pachinko machine or a table-top game. In various embodiments, a gaming device may comprise, for example, a personal computer (e.g., which communicates with an online casino Web site), a telephone (e.g., to communicate with an automated sports book that provides gaming services), or a portable handheld gaming device (e.g., a PDA or Nintendo GameBoy). The gaming device may comprise any or all of the gaming devices of the aforementioned systems. In some embodiments, a user device such as a PDA or cell phone may be used in place of, or in addition to, some or all of the gaming device components. Further, a gaming device may comprise a personal computer or other device operable to communicate with an online casino and facilitate game play at the online casino. In one or more embodiments, the gaming device may comprise a computing device operable to execute software that simulates play of a reeled slot machine game, video poker game, video blackjack game, video keno game, video roulette game, or lottery game.

The gaming device comprises a processor, such as one or more Intel® Pentium® processors. The processor is operable to communicate with a random number generator, which may be a component of the gaming device. The random number generator, in accordance with at least one embodiment of the present invention, may generate data representing random or pseudo-random values (referred to as "random numbers" herein). The random number generator may generate a random number every predetermined unit of time (e.g., every thousandth of a second) or in response to an initiation of a game on the gaming device. In the former embodiment, the generated random numbers may be used as they are generated (e.g., the random number generated at substantially the time of game initiation is used for that game) and/or stored for future use. A random number generated by the random number generator may be used by the processor to determine, for example, at least one of an outcome and payout. A random number generator, as used herein, may be embodied as a processor separate from but working in cooperation with the processor. Alternatively, the random number generator may be embodied as an algorithm, program component, or software stored in the memory of the gaming device and used to generate a random number. Note that, although the generation or obtainment of a random number is described herein as involving a random number generator of a gaming device, other methods of determining a random number may be employed. For example, a gaming device owner or operator may obtain sets of random numbers that have been generated by another entity. HotBits™, for example, is a service that provides random numbers that have been generated by timing successive pairs of radioactive decays detected by a Geiger-Muller tube interfaced to a computer. A blower mechanism that uses physical balls (e.g. ping pong balls) with numbers thereon may be used to determine a random number by randomly selecting one of the balls and determining the number thereof.

The processor may also be operable to communicate with a benefit output device, which may be a component of gaming device. The benefit output device may comprise one or more devices for outputting a benefit to a player of the gaming device. For example, in one embodiment the gaming device may provide coins and/or tokens as a benefit. In such an embodiment the benefit output device may comprise a hopper and hopper controller, for dispensing coins and/or tokens into a coin tray of the gaming device. In another example, the gaming device may provide a receipt or other document on which there is printed an indication of a benefit (e.g., a cashless gaming receipt that has printed thereon a monetary value, which is redeemable for cash in the amount of the monetary value). In such an embodiment the benefit output device may comprise a printing and document dispensing mechanism. In yet another example, the gaming device may provide electronic credits as a benefit (which, e.g., may be subsequently converted to coins and/or tokens and dispensed from a hopper into a coin tray). In such an embodiment the benefit output device may comprise a credit meter balance and/or a processor that manages the amount of electronic credits that is indicated on a display of a credit meter balance. In yet another example, the gaming device may credit a monetary amount to a financial account associated with a player as a benefit provided to a player. The financial account may be, for example, a credit card account, a debit account, a charge account, a checking account, or a casino account. In such an embodiment the benefit output device may comprise a device for communicating with a server on which the financial account is maintained. Note that, in one or more embodiments, the gaming device may include more than one benefit output device. For example, the gaming device may include both a hopper and hopper controller combination and a credit meter balance. Such a gaming device may be operable to provide more than one type of benefit to a player of the gaming device. A single benefit output device may be operable to output more than one type of benefit. For example, a benefit output device may be operable to increase the balance of credits in a credit meter and communicate with a remote device in order to increase the balance of a financial account associated with a player.

The processor is also operable to communicate with a display device, which may be a component of gaming device. The display device may comprise, for example, one or more display screens or areas for outputting information related to game play on the gaming device, such as a cathode ray tube (CRT) monitor, liquid crystal display (LCD) screen, or light emitting diode (LED) screen. In one or more embodiments, a gaming device may comprise more than one display device. For example, a gaming device may comprise an LCD display for displaying electronic reels and a display area that displays rotating mechanical reels.

The processor may also be in communication with one or more other devices besides the display device, for outputting information (e.g., to a player or another device). Such other one or more output devices may also be components of a gaming device. Such other one or more output devices may comprise, for example, an audio speaker (e.g., for outputting an outcome or information related thereto, in addition to or in lieu of such information being output via a display device), an infra-red transmitter, a radio transmitter, an electric motor, a printer (e.g., such as for printing cashless gaming vouchers), a coupon or product dispenser, an infra-red port (e.g., for communicating with a second gaming device or a portable device of a player), a Braille computer monitor, and a coin or bill dispenser. For gaming devices, common output devices include a cathode ray tube (CRT) monitor on a video poker machine, a bell on a gaming device (e.g., rings when a player wins), an LED display of a player's credit balance on a gaming device, an LCD display of a personal digital assistant (PDA) for displaying keno numbers.

The display device may comprise, for example, one or more display areas. For example, one of the display areas (e.g. a primary game screen) may display outcomes of games played on the gaming device (e.g., electronic reels of a gaming device). Another of the display areas (e.g. a secondary game screen) may display rules for playing a game of the gaming device. Yet another of the display areas may display the benefits obtainable by playing a game of the gaming device (e.g., in the form of a payout table). In one or more embodiments, the gaming device may include more than one display device, one or more other output devices, or a combination thereof (e.g., two display devices and two audio speakers).

The processor may also be in communication with an input device, which is a device that is capable of receiving an input (e.g., from a player or another device) and which may be a component of gaming device. An input device may communicate with or be part of another device (e.g. a server, a gaming device, etc.). Some examples of input devices include: a bar-code scanner, a magnetic stripe reader, a computer keyboard or keypad, a button, a handle, a keypad, a touch-screen, a microphone, an infrared sensor, a voice recognition module, a coin or bill acceptor, a sonic ranger, a computer port, a video camera, a motion detector, a digital camera, a network card, a universal serial bus (USB) port, a GPS receiver, a radio frequency identification (RFID) receiver, an RF receiver, a thermometer, a pressure sensor, an infrared port (e.g., for receiving communications from a second gaming device or from a another device such as a smart card or PDA of a player), and a weight scale. For gaming devices, common input devices include a button or touch screen on a video poker machine, a lever or handle connected to the gaming device, a magnetic stripe reader to read a player tracking card inserted into a gaming device, a touch screen for input of player selections during game play, and a coin and bill acceptor.

The processor may also be in communication with a payment system, which may be a component of the gaming device. The payment system is a device capable of accepting payment from a player (e.g., a bet or initiation of a balance) and/or providing payment to a player (e.g., a payout). Payment is not limited to money, but may also include other types of consideration, including products, services, and alternate currencies. Exemplary methods of accepting payment by the payment system include (i) receiving hard currency (i.e., coins or bills), and accordingly the payment system may comprise a coin or bill acceptor; (ii) receiving an alternate currency (e.g., a paper cashless gaming voucher, a coupon, a non-negotiable token), and accordingly the payment system may comprise a bar code reader or other sensing means; (iii) receiving a payment identifier (e.g., a credit card number, a debit card number, a player tracking card number) and debiting the account identified by the payment identifier; and (iv) determining that a player has performed a value-added activity (e.g., participating in surveys, monitoring remote images for security purposes, referring friends to the casino).

The processor is in communication with a memory and a communications port (e.g., for communicating with one or more other devices). The memory may comprise an appropriate combination of magnetic, optical and/or semiconductor memory, and may include, for example, Random Access Memory (RAM), Read-Only Memory (ROM), a compact disc and/or a hard disk. The memory may comprise or include any type of computer-readable medium. The processor and the memory may each be, for example: (i) located entirely within a single computer or other device; or (ii) connected to each other by a remote communication medium, such as a serial port cable, telephone line or radio frequency transceiver. In one embodiment, the gaming device may comprise one or more devices that are connected to a remote server computer for maintaining databases.

The memory stores a program for controlling the processor. The processor performs instructions of the program, and thereby operates in accordance with the present invention, and particularly in accordance with the methods described in detail herein. The program may be stored in a compressed, uncompiled and/or encrypted format. The program furthermore includes program elements that may be necessary, such as an operating system, a database management system and "device drivers" for allowing the processor to interface with computer peripheral devices. Appropriate program elements are known to those skilled in the art, and need not be described in detail herein.

The term "computer-readable medium" as used herein refers to any medium that participates in providing instructions to the processor of the gaming device (or any other processor of a device) for execution. Such a medium may take many forms, including but not limited to, non-volatile media, volatile media, and transmission media. Non-volatile media include, for example, optical or magnetic disks, such as memory. Volatile media include dynamic random access memory (DRAM), which typically constitutes the main memory. Transmission media include coaxial cables, copper wire and fiber optics, including the wires that comprise a system bus coupled to the processor. Transmission media may carry acoustic or light waves, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying one or more sequences of one or more instructions to the processor (or any other processor of a device described herein) for execution. For example, the instructions may initially be borne on a magnetic disk of a remote computer. The remote computer can load the instructions into its dynamic memory and send the instructions over a telephone line using a modem. A modem local to a gaming device (or, e.g., a server) can receive the data on the telephone line and use an infrared transmitter to convert the data to an infrared signal. An infrared detector can receive the data carried in the infrared signal and place the data on a system bus for the processor. The system bus carries the data to main memory, from which the processor retrieves and executes the instructions. The instructions received by main memory may optionally be stored in memory either before or after execution by the processor. In addition, instructions may be received via a communication port as electrical, electromagnetic or optical signals, which are exemplary forms of carrier waves that carry data streams representing various types of information. Thus, the gaming device may obtain instructions in the form of a carrier wave.

According to an embodiment of the present invention, the instructions of the program may be read into a main memory from another computer-readable medium, such from a ROM. Execution of sequences of the instructions in program causes processor perform the process steps described herein. In alternate embodiments, hard-wired circuitry may be used in place of, or in combination with, software instructions for implementation of the processes of the present invention. Thus, embodiments of the present invention are not limited to any specific combination of hardware and software. As discussed with respect to aforementioned systems, execution of sequences of the instructions in a program of a peripheral device in communication with the gaming device may also cause the processor to perform some of the process steps described herein.

The memory may store one or more databases including, for example, a probability database, a payout database, a player history database. Some or all of the data stored in each database is described herein. The described entries of the databases represent exemplary information only; those skilled in the art will understand that the number and content of the entries can be different from those illustrated herein. Further, despite any description of the databases as tables, an object-based model could be used to store and manipulate the data types of the present invention and likewise, object methods or behaviors can be used to implement the processes of the present invention.

Where appropriate, a prior art probability database may be utilized in the performance of the inventive processes described herein. A probability database may be stored in the data storage device in tabular form, or any other appropriate database form, as is well known in the art. The data stored therein may include a number of exemplary records or entries, each defining a random number. Those skilled in the art will understand that the probability database may include any number of entries. The tabular representation may also define fields for each of the entries or records. The fields may specify: (i) a random number (or range of random numbers) that may be generated by the random number generator; and (ii) an outcome that indicates the one or more indicia comprising the outcome that corresponds to the random number of a particular record. A gaming device may utilize a probability database to determine, for example, what outcome corresponds to a random number generated by a random number generator and to display the determined outcome. The outcomes may comprise the three symbols to be displayed along the payline of a three reel slot machine. Other arrangements of probability databases are possible. For example, the book "Winning At Slot Machines" by Jim Regan (Carol Publishing Group Edition, 1997) illustrates many examples of payout and probability tables and how they may be derived. The entirety of this book is incorporated by reference herein for all purposes.

Further, where appropriate, a prior art payout database may be utilized in the performance of the inventive processes described herein. A payout database may be stored in the data storage device in tabular form, or any other appropriate database form, as is well known in the art. The data stored therein includes a number of example records or entries, each defining an outcome that may be obtained on a gaming device that corresponds to a payout. Those skilled in the art will understand that the payout database may include any number of entries. The tabular representation also defines fields for each of the entries or records. The fields specify: (i) an outcome, which indicates the one or more indicia comprising a given outcome; and (ii) a payout that corresponds to each respective outcome. The outcomes may be those obtained on a three reel slot machine.

A gaming device may utilize the payout database to determine whether a payout should be output to a player as a result of an outcome obtained for a game. For example, after determining the outcome to output on the gaming device, the gaming device may access the payout database to determine whether the outcome for output is one of the outcomes stored as corresponding to a payout. If it is, the gaming device may provide the corresponding payout to the player.

Other arrangements of payout databases are possible. For example, the book "Winning At Slot Machines" by Jim Regan (Carol Publishing Group Edition, 1997) illustrates many examples of payout and probability tables and how they may be derived.

Additionally, where appropriate, a player tracking database may be utilized to store historical data associated with specific players. A player tracking database may be used to store player wager data so that players wagering over a given threshold in a given amount of time may be rewarded for their patronage. The player tracking database may also contain other information that may be useful in promoting and managing player behaviors (e.g., information about the player's outstanding debts, lodging arrangements, and the like). Further, the player tracking database may store data regarding a given player's standing in a gaming session or meta game, so that the player can continue the gaming session or meta game at a plurality of game machines that have common access to the player tracking database. Such player tracking data may be stored in a relational database and retrieved or otherwise accessed by the processor after receiving a "key" data point from the player, such as a unique identifier read from the player's player tracking card.

Note that, although these databases may be described as being stored in a gaming device, in other embodiments of the present invention some or all of these databases may be partially or wholly stored in another device, such as one or more of the peripheral devices, the peripheral device server and/or the server computer. Further, some or all of the data described as being stored in the databases may be partially or wholly stored (in addition to or in lieu of being stored in the memory of the gaming device) in a memory of one or more other devices, such as one or more of the peripheral devices, another gaming device, the peripheral device server and/or the computer.

As discussed herein, in one or more embodiments the gaming device may take the form of a slot machine configured to operate in conjunction with the present invention. A more specific description of a slot machine suitable for use with the present invention follows.

Generally, a slot machine for use in the present invention comprises a three reel or five reel slot machine. The slot machine comprises a display area in which an outcome for a game of the slot machine is displayed to the player. The display area may, for example, be a video display that displays graphical representations of reels. The display area may, in another example, be glass behind which are located mechanical reels. Within the display area is a payline. In accordance with one or more embodiments of the present invention, an outcome of a game is a set of symbols displayed along a payline of a reeled slot machine. The slot machine may further comprise a handle. A player may initiate the movement of the reels in the display area by pulling on the handle. Alternatively, a player may initiate the movement of the reels in the display area by actuating a start button. Either or both of the handle and start button are exemplary embodiments of the input device, described herein.

Where appropriate, the slot machine may also include an alternate, secondary game screen, for outputting information to a player. The secondary game screen may be utilized, for example, to inform a player of the player's standing in a meta-game.

The slot machine may also include a payment system, which is comprised of a bill acceptor, a credit card reader, and a coin acceptor. A player may utilize payment system to provide a wager for playing a game and or for providing payment for provision of an outcome.

The slot machine may further comprise a credit meter balance, which is an exemplary embodiment of a benefit output device that was described herein. The credit meter balance reflects the amount of electronic credits currently available to a player. The electronic credits may be used by a player, for example, as wagers for games played on the gaming device. The electronic credits may also be "cashed out" as coins, bills, tokens, a cashless gaming receipt, and/or credits to another financial account associated with the player.

Finally, the slot machine may comprise a coin tray. Payment to the player may be rendered by dispensing coins into the coin tray. Such coins may be dispensed based on, for example, a player's indication that the player would like to cash out his credit meter balance and/or a payout obtained by a player as a result of playing a game on the slot machine. The coin tray is an exemplary embodiment of the benefit output device, described herein. Note that, where appropriate, the slot machine may include different and/or additional components besides those discussed in this section.

Process Steps

Various embodiments of the present invention include methods.

Step 1: Initiate a Game Having a Time-based Element.

According to an embodiment of the present invention, a game having a time-based element is initiated at a gaming device. More specifically, a processor is instructed by a player to commence a game, for example, in response to the player's (1) manipulation of an input device such as a button operatively connected to a processor, (2) insertion of a player tracking card into a gaming device or peripheral device operative to receive and read player identification information from player tracking cards, or (3) insertion of a payment (e.g., cash, credit card, debit card) into a payment system operatively connected to a processor.

The game that is initiated may be a basic game, a meta-game, or both. An example of basic game having a time-based element is a video-poker themed game wherein dealt cards may expire and potentially be replaced by other cards after a predetermined or random amount of time. Such a game is described in detail in U.S. Pat. No. 6,176,781, issued Jan. 23, 2001 (this patent is incorporated herein by reference), as discussed herein. Examples of meta-games having time-based elements include, but are not limited to, meta-games having (1) expiration periods associated with symbols such as that which is described in U.S. Pat. No. 6,203,430, issued Mar. 20, 2001 (this patent is incorporated herein by reference), (2) time periods within which players must accumulate a total number of outcomes in order to qualify for a bonus payout, such as that which is described in U.S. Pat. No. 6,364,765, issued Apr. 2, 2002 (this patent is incorporated herein by reference), (3) time periods reflecting a player's "endurance" in relation to other players such as that which is described in U.S. Pat. No. 6,319,122, issued Nov. 20, 2001 (this patent is incorporated herein by reference). As stated, both a meta-game and a basic game can be initiated simultaneously or substantially simultaneously, so that a player may potentially qualify for at least one of a payout and a bonus payout after at least one outcome is determined by a random number generator.

Alternatively or additionally, the game having a time-based element may constitute a prepaid session period, such as a prepaid purchase of a unit of time within which many handle pulls are possible (temporal), or a prepaid number of handle pulls (arithmetical). U.S. patent application Ser. No. 10/001,089, filed Nov. 2, 2001 (this application is incorporated herein by reference); U.S. Pat. No. 6,077,163, issued Jun. 20, 2000 (this patent is incorporated herein by reference) and U.S. Pat. No. 6,012,983, issued Jan. 11, 2000 (this patent is incorporated herein by reference) all disclose various systems and methods for implementing games having prepaid session periods, and are all incorporated by reference herein for all purposes.

Alternatively or additionally, the game having a time-based element may constitute an entertainment-based payout that is output over a period of time, such as audio or video content, and is provided to a player as a reward for interacting with a gaming device. U.S. Pat. No. 6,234,896 issued May 22, 2001 (this patent is incorporated herein by reference) and U.S. Pat. No. 6,113,495, issued Sep. 5, 2001 (this patent is incorporated herein by reference) disclose various systems and methods enabling such entertainment-based payouts, and are accordingly incorporated by reference herein for all purposes.

Upon the initiation of a game having a time-based element, the processor may institute a measuring function, such as by denoting, in memory, the time reported by a clock element operatively connected with the processor, or by beginning an arithmetical count in a memory operatively connected with the processor. In this manner, the measuring function serves to assist in the tracking of the time-based element so that games are managed in accordance with the various time-based functions previously described. Many other methods of determining a relevant time period will be readily apparent to those of ordinary skill in the art.

Step 2: Identify a Command to Extend at Least one Time-based Element Associated With the Game.

The processor then identifies a command to extend the time-based element. This step can be triggered automatically (e.g. a command is received from the gaming device or other device), or upon a player's request (e.g. a command received form the player).

In an automatic embodiment, this step can be triggered randomly or based on rules stored in database. Random time extensions may be determined based on the activity of a random number generator, and would serve to add an element of "chance" to the time-element in the game. For example, a player of a meta-game having expiration periods associated with symbols such as that which is described in described in U.S. Pat. No. 6,203,430, issued Mar. 20, 2001 (this patent is incorporated herein by reference) may be pleasantly surprised when a tracked symbol, such as a lemon symbol derived from the reels of a slot machine, is prevented from expiring by an unanticipated time extension.

In another embodiment, stored rules may instruct the processor to extend a time-based element when game parameters meet a certain threshold. For example, stored rules may instruct the processor to automatically add another ten minutes to a meta-game which requires a player to collect a given number of slot symbols within one hour provided the player has colleted at least 80% of the required symbols within the first fifty minutes of the gaming session. Or, based on information retrieved from a player tracking database and stored rules, exceptionally loyal customers may receive time-extensions automatically. In yet an alternate stored-rules embodiment, a rule may merely trigger the processor to prompt the player, on a secondary game screen, with an offer to purchase a time extension for a fee. For example, in an embodiment where a player has been awarded entertainment-based content as a payout, the player may be prompted with the option of paying a fee to extend the content so that he or she may enjoy viewing the resolution of a plot in a story.

In an embodiment where players may request time extensions at any time, the primary or secondary game screens, or other output devices, may be instructed by the processor to output an offer to the player to extend a time-based element. Such an offer may be provided at the beginning of a game, or periodically or continuously thereafter. Players may accept such offers at any time by initiating a signal to the processor via an input device operatively connected thereto, by inserting payment into the gaming device's payment system, or both. For example, a textual offer, based in part on information retrieved from a player tracking database, may be communicated via the secondary game screen upon commencement of a prepaid session. Such an offer may read: "Mr. Smith, you can pay to extend your prepaid session at any time before the end of the session by depositing additional payment. Insert $5 for an extra 30 minutes, or $10 for an extra 70 minutes. Good luck!"

In yet another alternate embodiment, a player may request a custom-tailored time extension, and the processor may calculate and output a price for the extension. Prices could be calculated as a function of the game's probability and payout parameters in a manner that maintains casino profitability over time, as disclosed in U.S. patent application Ser. No. 10/001,089, filed Nov. 2, 2001 (this application is incorporated herein by reference) and U.S. Pat. No. 6,077,163, issued Jun. 20, 2000 (this patent is incorporated herein by reference).

Step 3: Extend at Least One Time-based Element Associated Eith the Game

After the processor identifies a command to extend at least one time-based element associated with the game, the processor executes the command to extend the time-based element. Execution of the command may be achieved generally by altering a record stored in memory to reflect an extension of time, and communicating the change to the player via an output device such as the secondary game screen.

Memory records that may be altered as a result of the time-extension command include those which indicate (1) a time associated with a player that is tracked for purposes of qualifying the player for a payout resulting from a basic game, including an expiration period associated with a component of an outcome in a basic game, such as a card in a poker-themed game; (2) a time associated with a player or gaming session that is tracked for purposes of qualifying the player for a bonus payout resulting from a meta-game, such as (a) an expiration period associated with a symbol that is tracked for purposes of qualifying a player for a bonus payout, (b) a time period within which a player must accumulate a total number of outcomes in order to qualify for a bonus payout, (c) a time period reflecting the registration of a player in a multi-player, endurance-oriented meta-game that is tracked for purposes of qualifying a player for a bonus payout; (3) a prepaid session period; (4) an entertainment-based payout that is output over a period of time, such as audio or video content, and is provided to a player as a reward for interacting with a gaming device; (5) a time period that is tracked for purposes of qualifying a player for "comp" benefits; or (6) any combination thereof.

Figure 4:
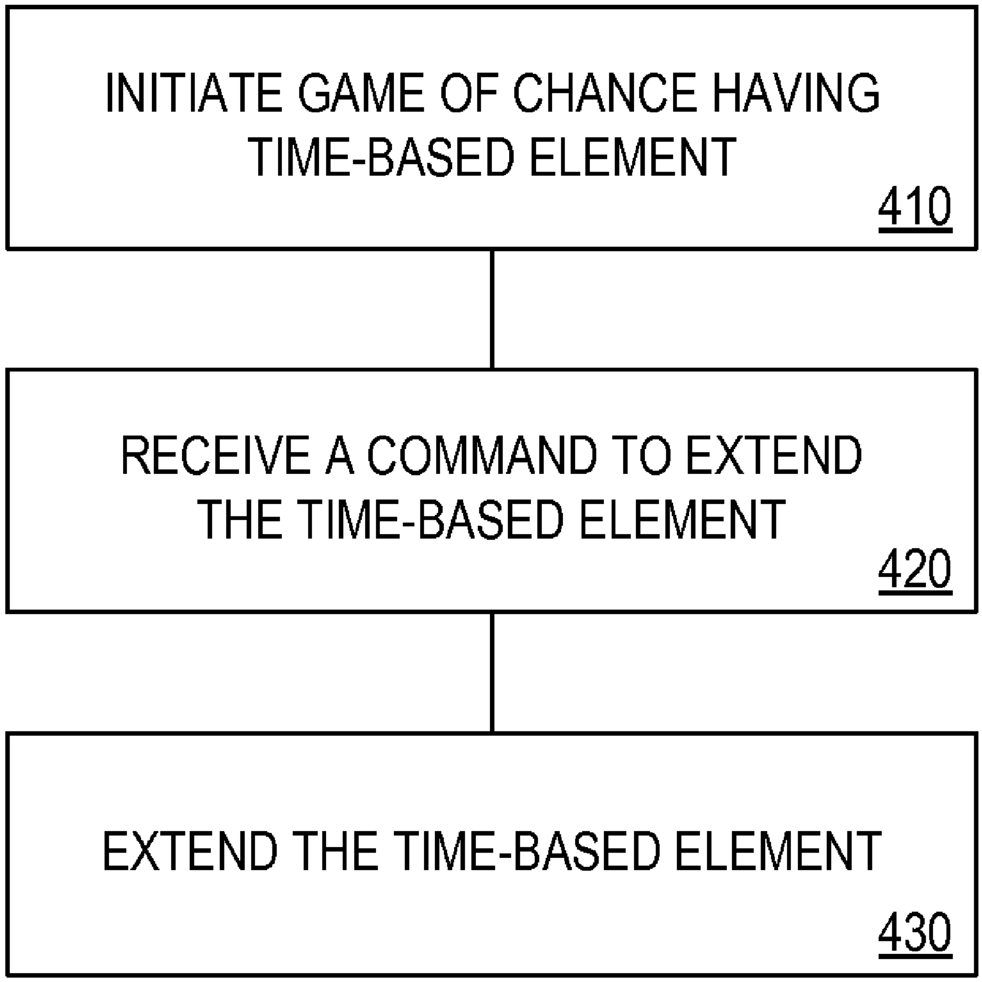
FIG. 4 is a flowchart of an exemplary and non-limiting embodiment described herein.

With reference to FIG. 4, there is illustrated a flowchart of an exemplary and non-limiting embodiment of a method described herein. At step 410, a game of chance having a time-based element is initiated. Next, at step 420, a command to extend the time-based element is received. Then, at step 430, the time base element is extended.

ADDITIONAL EMBODIMENTS

Rather than paying for time extensions in cash, players may alternatively pay for time extensions by agreeing to sacrifice a percentage or a fixed portion of future winnings.

Time extensions can be negative. For example, in an embodiment where time extensions are determined by a random number generator, players may receive an accelerated expiration time for a symbol, or may lose a portion of a prepaid session.

Rather than paying cash for time extensions, players may alternatively be required to "work" for time extensions by, for example, answering survey questions, participating in focus groups, or the like.

Players may alternatively be given the option of receiving a time extension in exchange for agreeing to some future obligation. For example, a player may be given a time extension if they agree to return to the casino at least once within the next month.

EXAMPLES

The following examples merely illustrate various embodiments of the invention, and should not be construed as limiting the scope of the invention in any way.

1. Embodiments of the present invention may be employed in the context of a video poker gaming device configured to, at timed intervals, change the suit and/or rank of a previously-dealt card. Such a video poker gaming device is described in detail in U.S. Pat. No. 6,176,781 B1, the entirety of which is incorporated by reference herein for all purposes. In such a context, embodiments of the present invention may be employed to allow players to pay a fee to keep a dealt card from expiring for an extended period of time. Alternatively, the video poker gaming device may be configured to randomly award time extensions for the previously-dealt cards.
   a. For example, John sits down at a video poker machine configured to expire and alter certain cards after they are dealt. After initiating game play by inserting a $5 bill into the machine, John proceeds to assemble his "hand" using the dealt cards. John is then faced with the possibility that some of the cards in his hand may change suit after a period of time. Since John considers Hearts to be his lucky suit, he selects a button on the video poker machine to indicate that he would like to pay one dollar in order for the ability to prevent Hearts from expiring for at least three more minutes.
2. The present invention may also be employed in the context of a slot machine or other gaming device configured to provide a bonus payout upon the completion of a meta-game, such as where a bonus payout is awarded to slot players who, throughout a gaming session, "accumulate" a threshold number of designated outcomes such as reel symbols. In U.S. Pat. No. 6,203,430, issued Mar. 20, 2001 (this patent is incorporated herein by reference), such a meta-game is disclosed whereby accumulated symbols are set to "expire" after they are acquired, making the meta-game more challenging and entertaining. The present invention may work in conjunction with such a meta-game to allow players the option of paying to keep a symbol from expiring for prolonged time periods, thereby increasing their ability to win the meta-game. Alternatively, the time-extension may be awarded randomly to players.
   a. For example, Mary initiates game play at a slot machine configured to award a bonus payout for accumulation of ten "bell" symbols. After three handle pulls, Mary has collected three bell symbols. However, on her fourth handle pull, the first bell symbol expires, and she is left with two bell symbols for use in the meta-game. To delay further expiration, Mary accepts an offer to add five minutes to the expiration of the remaining two bell symbols by depositing an additional $0.25. Mary then continues the gaming session with confidence, knowing that she has more time to accumulate the eight more bell symbols required for a bonus payout.
3. The present invention may be employed in the context of a meta-game that awards bonus payouts to players who accumulate a threshold amount of required outcomes in a certain amount of time. For example, a slot machine may award a $50 restaurant voucher to players who "collect" 100 lemon outcomes in thirty minutes of game play. Although such a meta-game would indeed function to prolong gambling and entertain players, players may be frustrated if they are close to winning by the end of the time period but fail to win the bonus payout. Accordingly, the present invention may be employed to allow players to purchase an extra period of time within which to accumulate the missing outcomes required to win the bonus payout.
   a. For example, Sue has been playing a meta-game enabled slot machine that requires her to collect 50 cherry symbols in 15 minutes in order to receive the bonus payout of $25. After 12 minutes have elapsed and Sue has only collected 38 cherry symbols, the slot machine communicates an offer to her through the secondary game screen. The offer reads: "You need just 12 more cherry symbols to win the $25 bonus payout, but time is running out! Just deposit $1.00 for an extra five minutes." Sue accepts the offer by selecting an area of the device's touch-screen that is labeled "accept", and deposits $1.00.

4. The present invention may be employed in the context of a multi-player, endurance-oriented meta-game, such as that which is described in U.S. Pat. No. 6,319,122, issued Nov. 20, 2001 (this patent is incorporated herein by reference). Such a meta-game may allow slot players to enjoy potential bonus payouts from the gambling activity of other players who commenced play after the player. The present invention may work in conjunction with such a meta-game so as to enable "downstream" players to purchase (or win) earlier record times and thereby artificially extend the time associated with their gaming activity.
   a. For example, Sarah arrives at the casino late in the evening on Friday night. Because many people arrived before her, they have earlier record times in the ongoing endurance meta-game. Sara approaches a kiosk, inserts her player tracking card, and begins to nonetheless register for the endurance meta-game. However, the screen on the kiosk outputs a prompt to Sara, offering her the ability to get a record time of two hours earlier for a fee. Because Sara feels like she has been missing out of the "action" at the casino, she accepts the offer to extend the time associated with her casino patronage, and thereby "buys into the action."
5. The present invention may also operate to prolong prepaid sessions, such as those enabled by U.S. Pat. No. 6,077,163, issued Jun. 20, 2000 (this patent is incorporated herein by reference), U.S. patent application Ser. No. 10/001,089, filed Nov. 2, 2001 (this application is incorporated herein by reference), and U.S. Pat. No. 6,012,983, issued Jan. 11, 2000 (this patent is incorporated herein by reference).
   a. For example, Bob has prepaid $20 for an hour's worth of slot machine outcomes at a machine configured to allow such an arrangement. For 55 minutes, Bob pulled the handle furiously, determined to get his money's worth out of the slot machine. However, as the end of the hour approaches, Bob reflects on his streak of bad luck. Accordingly, he accepts an offer to prolong the session for 10 more minutes for a mere $1.

The present invention may also operate in conjunction with gaming devices configured to output entertainment-based payouts, such as the gaming devices disclosed in U.S. Pat. No. 6,234,896 issued May 22, 2001 (this patent is incorporated herein by reference) and U.S. Pat. No. 6,113,495 issued Sep. 5, 2001 (this patent is incorporated herein by reference). Employing functionality enabled by the present invention, players may purchase or win extended entertainment payouts.

b. For example, after receiving a winning outcome at a slot machine, Mark was permitted to view a limited portion of a movie on the machine's secondary game screen. Although Mark could continue playing the slot machine to receive the next part of the video sequence as a subsequent payout, he wishes to view the next part of the video sequence immediately and accordingly selects an option to pay $0.50 to view the next sequence.

6. The present invention may also operate in conjunction with devices configured to track player patronage of casinos for the purpose of qualifying players for loyalty rewards or "comps." As discussed herein, information concerning player patronage is stored in a central player tracking database that is updated as players, identified through player tracking cards, interact with gaming devices. Casino gaming devices and casino personnel can refer to this stored data in order to determine which players should be rewarded for their loyalty. Although such determinations are often made based on the amount of money that a given player has spent at a casino, such determinations are also frequently made based on the duration of a player's patronage, including (i) how long the player has been a customer of the casino (e.g. 3 years), (ii) how long the player is visiting the casino on a particular trip (e.g. 5 days), and (iii) how long a player has been playing a particular game (i.e. gaming session duration). According to some embodiments, players may win or purchase an extension of the time associated with their patronage, so that they qualify for greater "comp" rewards.
   a. For example, Bill has been playing slot machine games for two hours on Saturday night when he decides its time to take a break for dinner. Because the casino regularly "comps" players with free meals at the casino buffet restaurant after players have spent at least three hours playing slots, Bill navigates through a menu on a slot machine and purchases an hour of "comp" time to be added to his current session, which results in a "free" meal at the restaurant. Although Bill has to pay for the added comp time in order to qualify for a meal voucher, the amount that Bill has to pay is a small percentage of what he otherwise would have paid for the meal. Thus, the present invention allows Bill the opportunity to realize the comp "equity" he has built up with the casino during his two hours of play.
   b. In another example, Bill has been playing a slot machine for an hour and is ready for lunch. Since he needed two hours of play to qualify for a lunch buffet comp, Bill resigns himself to having to pay for lunch. But on his next handle pull, he lines up three clock symbols on the payline. While the three clock symbols pay no coins, they do provide an extra hour of comp time at the machine. With the hour he earned already, Bill now had the required two hours of comp time and received a buffet comp for lunch.

We claim:

1. A method of operating a gaming system including a memory device which stores a plurality of instructions, the method comprising:

causing a processor to execute the plurality of instructions to initiate, on a gaming device, a game having a designated outcome that does not depend on any skill of a player of the game, the game being associated with an extendable time-based element and the game having a first average expected payout prior to any extension of the time-based element;

receiving a command to extend the time-based element associated with the game, the command being triggered by at least one of: (a) a random number being determined, and (b) a player's performance in the game being at least equal to a performance threshold such that the player is performing at least as well as indicated by the performance threshold; and in response to receiving the command, causing the processor to execute the plurality of instructions to extend the time-based element associated with the game, the game having a second, different average expected payout after the extension of the time-based element.

2. The method of claim 1, in which receiving the command comprises:

receiving the command from the player.

3. The method of claim 1, in which receiving the command comprises:

receiving the command from a device.

4. The method of claim 3, in which receiving the command comprises:

evaluating at least one rule.

5. The method of claim 3, in which receiving the command comprises:

extending the time-based element when a game parameter meets a predetermined threshold.

6. The method of claim 3, further comprising:

determining a random amount; and extending the time-based element by the random amount.

7. The method of claim 1, further comprising:

providing an offer to purchase a time extension.

8. The method of claim 1, further comprising:

determining whether to provide an offer for a time extension.

9. The method of claim 1, further comprising:

receiving a request to purchase a time extension.

10. The method of claim 1, further comprising:

measuring a time associated with the time-based element associated with the game.

11. The method of claim 10, in which measuring a time associated with the time-based element of the game comprises:

starting a timer.

12. The method of claim 1, further comprising:

determining a relevant time period associated with the time-based element associated with the game.

13. The method of claim 1, further comprising:

recalculating an expiration time associated with the extended time-based element.

14. The method of claim 1, in which the game is a basic game.

15. The method of claim 1, wherein the game comprises at least one random element.

16. The method of claim 15, wherein the at least one random element comprises a random number.

17. The method of claim 1, wherein the time-based element comprises an expiration period associated with a symbol.

18. The method of claim 17, wherein the symbol is tracked to determine a qualification of the player of the game for a bonus payment.

19. The method of claim 1, wherein the time-based element comprises a period of time tracked in order to determine a qualification of the player of the game for at least one comp benefits.

20. The method of claim 1, wherein the designated outcome has a first probability of occurring in association with the game prior to any extension of the time-based element and the designated outcome has a second, different probability of occurring in association with the game after the extension of the time-based element.

21. An apparatus comprising:

a processor; and a storage device in communication with the processor, the storage device storing a program which is capable of directing the processor to:

initiate a game having a designated outcome that does not depend on any skill of a player of the game, the game being associated with an extendable time-based element and the game having a first average expected payout prior to any extension of the time-based element;

receive a command to extend the time-based element associated with the game, the command being triggered by at least one of: (a) a random number being determined, and (b) a player's performance in the game being at least equal to a performance threshold such that the player is performing at least as well as indicated by the performance threshold; and in response to receiving the command, causing the processor to execute the plurality of instructions to extend the time-based element associated with the game, the game having a second, different average expected payout after the extension of the time-based element.

22. The apparatus of claim 21, wherein the command is received from the player.

23. The apparatus of claim 21, wherein the command is received from a device.

24. The apparatus of claim 23, wherein when executed by the processor, the plurality of instructions cause the processor to evaluate at least one rule in association with receiving the command.

25. The apparatus of claim 23, wherein when executed by the processor, the plurality of instructions cause the processor to extend the time-based element when a game parameter meets a predetermined threshold.

26. The apparatus of claim 23, wherein when executed by the processor, the plurality of instructions cause the processor to determine a random amount and extend the time-based element by the determined random amount.

27. The apparatus of claim 21, wherein when executed by the processor, the plurality of instructions cause the processor to provide an offer to the player to purchase a time extension.

28. The apparatus of claim 21, wherein when executed by the processor, the plurality of instructions cause the processor to determine whether to provide an offer to the player for a time extension.

29. The apparatus of claim 21, wherein a request to purchase a time extension is received.

30. The apparatus of claim 21, wherein when executed by the processor, the plurality of instructions cause the processor to measure a time associated with the time-based element associated with the game.

31. The apparatus of claim 30, wherein measuring a time associated with the time-based element associated with the game comprises:

starting a timer.

32. The apparatus of claim 21, wherein when executed by the processor, the plurality of instructions cause the processor to determine a relevant time period associated with the time-based element associated with the game.

33. The apparatus of claim 21, wherein when executed by the processor, the plurality of instructions cause the processor to recalculate an expiration time of the extended time-based element.

34. The apparatus of claim 21, in which the game is a basic game.

35. A computer readable medium storing a plurality of instructions executable by a processor to cause the processor to:

initiate a game having a designated outcome that does not depend on any skill of a player of the, the game being associated with an extendable time-based element and the game having a first average expected payout prior to any extension of the time-based element;

receive a command to extend the time-based element associated with the game, the command being triggered by at least one of: (a) a random number being determined, and (b) a player's performance in the game being at least equal to a performance threshold such that the player is performing at least as well as indicated by the performance threshold; and in response to receiving the command, extend the time-based element associated with the game, the game having a second, different average expected payout after the extension of the time-based element.

36. A method of operating a gaming system including a memory device which includes a plurality of instructions, the method comprising:

causing a processor to execute the plurality of instructions to initiate, on a gaming device, a game having a designated outcome that does not depend on any skill of a player of the game, the game being associated with an extendable time-based element and the game having a first average expected payout prior to any extension of the time-based element;

receiving a command to extend the time-based element associated with the game, the command being triggered by at least one of: (a) a random number being determined, and (b) a player's performance in the game being at least equal to a performance threshold such that the player is performing at least as well as indicated by the performance threshold; and in response to receiving the command, causing the processor to execute the plurality of instructions to configure the gaming device to extend the time-based element associated with the game, the gaming having a second, different average expected payout after the extension of the time-based element.

* * * * *

UNITED STATES PATENT AND TRADEMARK OFFICE

CERTIFICATE OF CORRECTION

PATENT NO. : 7,740,534 B2
APPLICATION NO. : 10/778984
DATED : June 22, 2010
INVENTOR(S) : Walker et al.

It is certified that error appears in the above-identified patent and that said Letters Patent is hereby corrected as shown below:

IN THE CLAIMS:

In Claim 19, Column 21, Line 53, replace “benefits” with --benefit--.

In Claim 35, Column 22, Line 62, replace “player of the, the game” with --player of the game, the game--.

In Claim 36, Column 24, Line 14, replace “gaming” with --game--.

Signed and Sealed this

Twelfth Day of October, 2010

David J. Kappos
*Director of the United States Patent and Trademark Office*

UNITED STATES PATENT AND TRADEMARK OFFICE

CERTIFICATE OF CORRECTION

PATENT NO. : 7,740,534 B2
APPLICATION NO. : 10/778984
DATED : June 22, 2010
INVENTOR(S) : Jay S. Walker et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 834 days.

Signed and Sealed this

Twenty-third Day of November, 2010

David J. Kappos
*Director of the United States Patent and Trademark Office*